May 11, 1937.　　　F. E. FREY　　　2,079,935
PROCESS FOR CONVERTING HYDROCARBONS
Filed Sept. 17, 1934
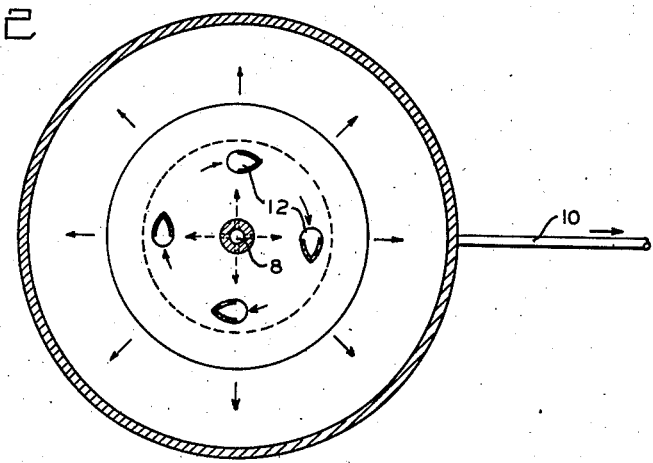
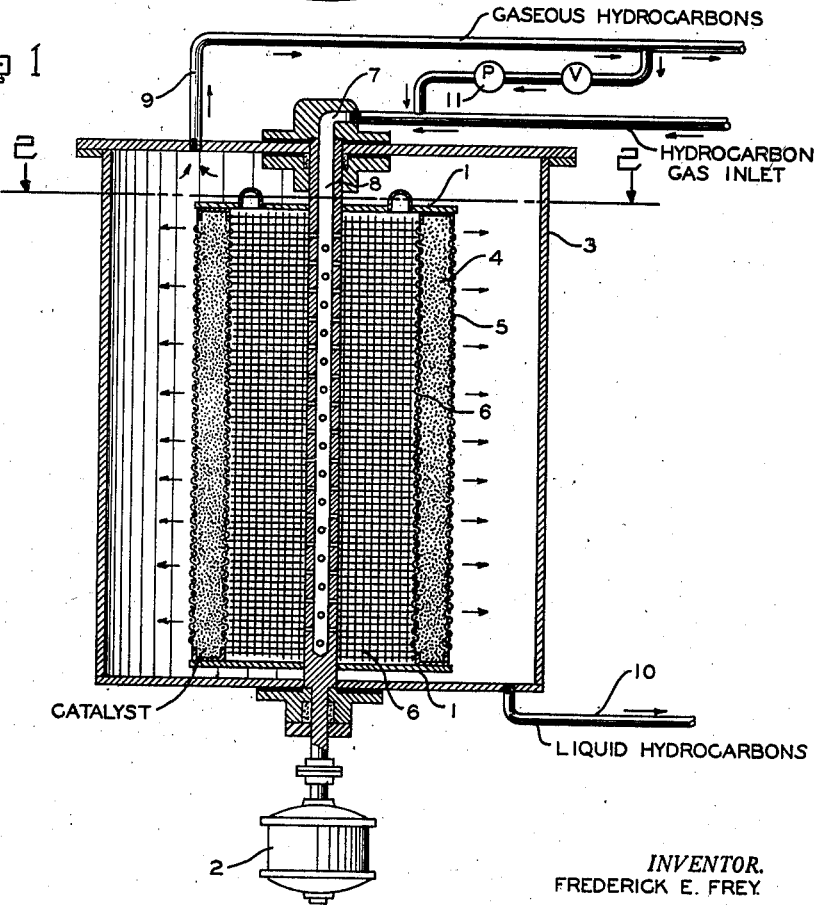
INVENTOR.
FREDERICK E. FREY
BY
ATTORNEYS.

Patented May 11, 1937

2,079,935

UNITED STATES PATENT OFFICE 2,079,935

PROCESS FOR CONVERTING HYDROCARBONS

Frederick E. Frey, Bartlesville, Okla., assignor to Phillips Petroleum Company, Bartlesville, Okla., a corporation of Delaware Application September 17, 1934, Serial No. 744,431

5 Claims. (Cl. 196—10)

This invention relates to processes for converting the gaseous olefins into normally liquid hydrocarbons by the agency of catalytic contact agents. More specifically this invention is concerned with effecting the formation of volatile normally liquid polymers of low molecular weight, and suitable for motor fuel, while minimizing the formation of involatile heavier products.

It has long been known that many substances, notably solid aluminum chloride and active fuller's earth, will catalytically induce the polymerization of the simpler olefins, as isobutylene, propylene, and the butenes to products of higher boiling point, in many cases of very high molecular weight.

Polymers of low molecular weight can be obtained by treating simple olefins with a polymerization catalyst under conditions of high reaction temperature and low pressure, in the neighborhood of atmospheric. When a higher pressure is used, a far higher conversion rate is obtained; the reaction temperature is lowered and the life of the catalyst is usually lengthened. While the gases undergoing treatment will under such conditions remain in the gaseous state, the polymers may assume the liquid form and coat the catalyst surface, and I have found that under such conditions an excessive proportion of the polymers formed are of undesirably high molecular weight.

I have discovered that polymers of low molecular weight may be produced under such conditions, by disposing the catalytic material in granular form in a container or basket adapted to be rotated rapidly during the conversion. Apparently the centrifugal force of the rotation discharges the liquid from the surface of the granules leaving a thin film of liquid to encourage rapid reaction while permitting the polymers formed initially to reside for but a short time on the catalytic surface and so escape the undesirable further polymerization. It has been commonly assumed that the preferential adsorption of polymers by the catalyst is responsible for the almost exclusive formation of high polymers often observed, but the effectiveness of mechanically rotating the catalyst unit indicates on the contrary that the higher polymers are rather to be ascribed to the prolonged residence of the simpler polymers in a heavy liquid film covering the catalytic surfaces.

A catalyst suitable for my process is a hydrous alumina supported on silica which has been described by Gayer (Ind. Eng. Chem. 25, 1122 (1933)). It may be prepared by neutralizing an aqueous sodium silicate solution with hydrochloric acid, thus precipitating hydrous silica, removing the salts by repeated washing with water, then covering the silica with a dilute aqueous solution of aluminum sulfate or chloride to produce an adsorbed layer of alumina, and finally washing again with water and drying. Fuller's earth, fuller's earth activated by mineral acids, aluminum chloride supported on granular pumice stone or the like, and other polymerization catalysts may also be used. The attached drawing forming a part of this specification illustrates one form of an apparatus which may be employed to realize the present invention.

Fig. 1 illustrates in cross-section one modification of an apparatus for realizing the invention, it being understood that the apparatus so illustrated may have either a vertical or a horizontal axis as is desired, and, Fig. 2 is a cross-sectional view of the apparatus illustrated in Fig. 1 and is taken on line 2—2 thereof looking in the direction of the arrows.

In the attached drawing is shown an apparatus suitable for the process. A cylindrical container, 1, for holding the catalyst is mounted on a shaft and may be rotated by motor 2. Container 1 is situated within a sealed housing 3. The catalyst in granular form 4 is confined in an annular space between a perforated sheet or reinforced wire gauze cylinder 5 which serves as the outer shell of the rotating member 1, and an inner concentric perforated or wire gauze cylinder 6. Means for introducing hydrocarbon gas to the inner space of the rotating member 1 are shown; the gas enters at 7 and is led into the inner space through passageway 8 which communicates with the interior of container 1. Gaseous and liquid hydrocarbons may be removed from housing 3 by conduits 9 and 10 respectively. By means of pump 11 a part of the gases discharged through conduit 9 may be returned through pipe 7 to container 1.

The operaton of the process is as follows: The hydrocarbons to be subjected to the polymerizing operation and containing simple olefins are introduced in a gaseous or vaporous condition through conduit 7 and passageway 8 to the catalyst container 1, the container being maintained in rapid rotation by means of motor 2. The hydrocarbons pass in a radial direction through the catalyst bed, in which a part of the olefins present is converted into polymers a substantial part of which appear in the liquid form at the temperature and pressure maintained for the reaction. The liquids thrown from the rotating container collect in the lower part of the housing and are withdrawn through conduit 10. Gases and vapors discharged from the rotating container into the housing pass out through conduit 9. Complete conversion is not desirable when volatile polymers are to be made. Consequently the gases discharged through 9 contain unconverted simple olefins and a part of the gases may be returned to the conversion operation by pump 11, or by apertures 12 in the end of the rotating container. The gases discharged from the system contain polymers in the vapor form which may be extracted from the gas, a part of which gas may then be returned to the conversion step, or to a second polymerization apparatus to effect a conversion of surviving olefins into polymers.

I have found that the simpler olefins vary widely in the ease with which they undergo catalytic polymerization. Temperatures varying all the way from 0° C. to 300° C. may be required for most efficient operation and pressures from less than atmospheric to 500 pounds per square inch or more, the higher temperatures and pressures being required when chiefly the less reactive olefins are to be polymerized. When olefinic gases such as those produced by oil cracking operations are to be treated, temperatures of 100 to 250° C. and pressures of 200 to 500 pounds or somewhat more are usually required with an active siliceous material as catalyst.

The velocity of rotation is not critical but for best results should be sufficently high to impose a centrifugal force of at least 100 times that of gravity on the catalyst proper.

Simple olefins suitable for polymerization are present in the lighter products of gas or oil cracking or dehydrogenation and are associated with paraffin hydrocarbon and other gases which are substantially inert. Gases predominating in olefins as well as those containing but a small proportion of olefins, as little as five percent, may be converted by the process, the gases of low olefin content requiring the higher operating pressures. Ethylene is converted with difficulty in many cases, but the higher olefins of from 3 to 4 or more carbon atoms per molecule may be readily polymerized in the process under the conditions set forth.

*Example.*—A granular catalyst consisting of hydrous silica gel, impregnated with a small amount of aluminum chloride and dried, was maintained at 25° C. while isobutylene at atmospheric pressure was passed over the catalyst at such a rate that 94 percent of the isobutylene was converted into polymers. Of the polymers former, 90 percent distilled above 170° C.

Another portion of the same catalytic material was mounted in an annular bed in a cylindrical container rotated at such a velocity that a centrifugal force 500 times that of gravity was developed. While maintaining about 25° C. and atmospheric pressure, isobutylene was passed into the inner part of the cylindrical container, liquid and gases were collected and separately withdrawn from a housing which enclosed the rotating catalyst container, and the gases were returned to the catalyst. A 90-95 percent conversion of isobutylene into polymers was obtained of which only 16 percent distilled above 170° C.

What I claim and desire to secure by Letters Patent is:

1. In processes in which normally gaseous olefin containing hydrocarbons are contacted with a pervious body of solid catalytic material to convert them to normally liquid hydrocarbons of relatively low molecular weight predominantly of gasoline boiling range, the method of reducing further polymerization of said liquid polymers to higher boiling hydrocarbons than of gasoline range which comprises imparting movement to said body in such a manner as to subject said liquid polymers, upon the formation thereof, to a component of centrifugal force sufficient to rapidly remove said polymers from said body.

2. A process for converting simple normally gaseous olefins into hydrocarbons predominantly in the boiling range of gasoline, which comprises contacting a hydrocarbon mixture containing such simple normally gaseous olefins at a polymerization temperature with a pervious body of solid polymerization catalyst thereby polymerizing said gaseous olefin hydrocarbons to liquid polymers on the surface of the catalyst, and imparting movement to said body in such a manner as to subject said polymers to a component of centrifugal force sufficient to rapidly remove the majority of said liquid polymers from said body prior to their conversion to polymers of higher boiling range than gasoline.

3. A process for converting simple normally gaseous olefin containing hydrocarbons into hydrocarbons predominantly in the boiling range of gasoline, which comprises passing said olefin containing hydrocarbons while in a gaseous state and at a polymerization temperature through a pervious bed of catalytic material thereby polymerizing said gaseous olefin hydrocarbons to liquid polymers on the surface of the catalyst, and rapidly revolving said bed about an axis thereby exerting a component of centrifugal force on said polymers to rapidly remove them from said body prior to their conversion to polymers of higher boiling range than gasoline.

4. In a process for producing normally liquid hydrocarbons predominantly of gasoline boiling range from normally gaseous olefin containing hydrocarbons by polymerization in a body of pervious catalytic material, the step of rapidly removing the liquid polymers of relatively low molecular weight from said catalyst body prior to their conversion to polymers of relatively higher molecular weight than gasoline by imparting motion to said body in such a manner as to subject said liquid polymers upon formation thereof to a component of centrifugal force.

5. A process for converting simple normally gaseous olefin containing hydrocarbons into hydrocarbons predominantly in the boiling range of gasoline, which comprises passing said olefin containing hydrocarbons while in a gaseous state and at a polymerization temperature through a substantially cylindrical bed of pervious, solid catalytic material thereby polymerizing said gaseous olefin hydrocarbons to liquid polymers on the surface of the catalyst, and rapidly rotating said bed about its axis thereby exerting a component of centrifugal force on said polymers to rapidly remove them from said body prior to their conversion to polymers of higher boiling range than gasoline.

FREDERICK E. FREY.